United States Patent
Otsubo

(10) Patent No.: US 7,540,211 B2
(45) Date of Patent: Jun. 2, 2009

(54) GEAR SHIFTING COMPLETION DETERMINING DEVICE AND GEAR SHIFTING COMPLETION DETERMINING METHOD

(75) Inventor: Masaaki Otsubo, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 450 days.

(21) Appl. No.: 11/522,415

(22) Filed: Sep. 18, 2006

(65) Prior Publication Data

US 2007/0066441 A1    Mar. 22, 2007

(30) Foreign Application Priority Data

Sep. 22, 2005    (JP) .............................. 2005-276413

(51) Int. Cl.
*F16H 59/00* (2006.01)

(52) U.S. Cl. .................................................. 74/336 R

(58) Field of Classification Search .................. None
See application file for complete search history.

(56) References Cited

U.S. PATENT DOCUMENTS

| | | | | |
|---|---|---|---|---|
| 4,849,888 A | * | 7/1989 | Seto ............................. | 701/51 |
| 5,832,777 A | * | 11/1998 | Weilant ........................ | 74/335 |
| 6,536,297 B2 | * | 3/2003 | Yamamoto .................... | 74/335 |
| 6,561,050 B2 | * | 5/2003 | Yamamoto .................... | 74/335 |
| 6,591,704 B2 | * | 7/2003 | Kamiya et al. ................ | 74/335 |
| 6,935,204 B2 | * | 8/2005 | Walker et al. ................. | 74/335 |

FOREIGN PATENT DOCUMENTS

| | | |
|---|---|---|
| EP | 1 193 425 A2 | 4/2002 |
| EP | 1 232 901 A2 | 8/2002 |
| JP | 2003-74684 | 3/2003 |

* cited by examiner

*Primary Examiner*—Dirk Wright
(74) *Attorney, Agent, or Firm*—Oblon, Spivak, McClelland, Maier & Neustadt, P.C.

(57) ABSTRACT

The ECU executes a program including the step of setting a threshold value A to be compared with a stroke amount of an actuator for determining whether gear shifting has completed or not, taking no account of a deflection amount C of the hardware due to the shift load, when the vehicle speed V is higher than a predetermined vehicle speed V(0), and the step of setting a threshold value B to be compared with the stroke amount of the actuator for determining whether gear shifting has completed or not, to a value obtained by adding the deflection amount C of the hardware due to the shift load to the threshold value A used when the vehicle speed V is not lower than V(0), when the vehicle speed V is lower than the predetermined vehicle speed V(0).

9 Claims, 5 Drawing Sheets

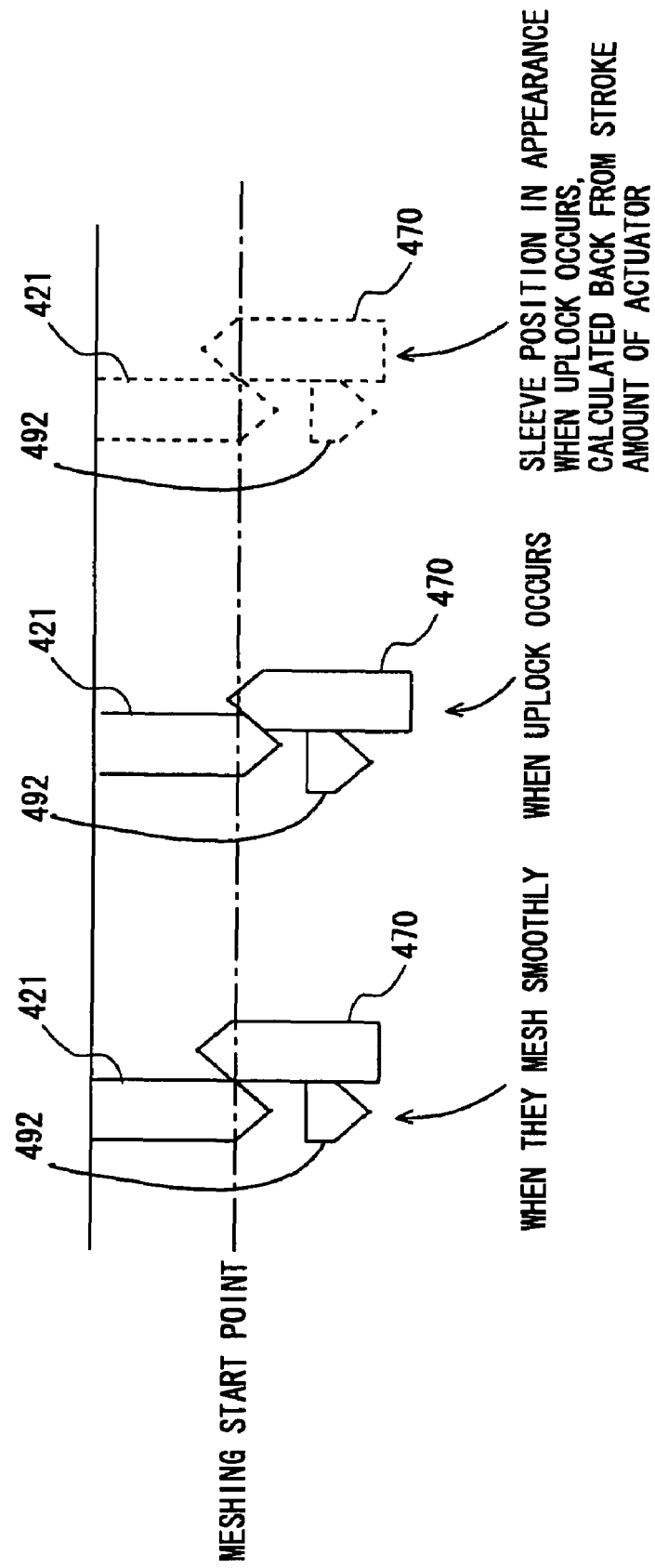

GEAR SHIFTING COMPLETION DETERMINING DEVICE AND GEAR SHIFTING COMPLETION DETERMINING METHOD

This nonprovisional application is based on Japanese Patent Application No. 2005-276413 filed with the Japan Patent Office on Sep. 22, 2005, the entire contents of which are hereby incorporated by reference.

BACKGROUND OF THE INVENTION

1. Field of the Invention

The present invention relates to a gear shifting completion determining device and a gear shifting completion determining method, and particularly to a technique of appropriately determining completion of gear shifting in a transmission in which the gear shifting is effected by an actuator, in accordance with an operating state of a vehicle.

2. Description of the Background Art

Conventionally, in a transmission having a gear train of constant mesh gears, a technique of selecting a gear by moving a sleeve by an actuator is known. In such a transmission, particularly at the time of gear shifting during the stopped state of the vehicle, there may occur a phenomenon where the sleeve and the gear are out of synchronization and thus they do not mesh with each other (hereinafter, also referred to as "uplock"). This means that gear shifting needs to be carried out taking account of the uplock.

Japanese Patent Laying-Open No. 2003-074684 discloses an automatic gear shifting completion determining device capable of avoiding uplock. The automatic gear shifting completion determining device described in Japanese Patent Laying-Open No. 2003-074684 includes: an automatic clutch automatically performing a clutch engaging operation by an actuator for the clutch; an automatic transmission connected to an engine via the automatic clutch, having an actuator for the transmission that shifts a sleeve arranged between a plurality of gears in an axial direction based on an operation of a shift lever, and automatically shifting a gear in response to the axial movement of the sleeve; and a control unit controlling the automatic clutch and the automatic transmission by driving the actuator for the clutch and the actuator for the transmission such that, when the sleeve and the gear are not synchronized while the engine is stopped and the sleeve cannot be moved in the axial direction for shifting to a gear required by the operation of the shift lever, i.e., when the uplock occurs, the gear is shifted to the required gear after the gear is shifted to a prescribed gear different from the required gear. Determination as to whether uplock has occurred or not is made based on a detection signal from a position sensor detecting the position of the sleeve.

According to the automatic gear shifting completion determining device described in the publication, in the event that the uplock occurs when the engine is stopped and thus it is not possible to shift to the gear required by the operation of the shift lever, the gear is set to a prescribed gear. With such shifting to the prescribed gear, "dislocation" is generated in the rotational direction between the gears for establishment of gear shifting to the required gear, which increases the possibility of avoiding the uplock. The gear is then set to the gear required by the operation of the shift lever under the condition that the possibility of avoiding the uplock is enlarged.

The hardware such as a gear train would suffer "deflection" by the load of the actuator, particularly upon occurrence of the uplock. With such "deflection", even if the sleeve and the gear do not mesh with each other, the amount of stroke of the actuator may increase to the level where the sleeve and the gear would mesh in the absence of the "deflection". Thus, it may be conceivable to determine completion of the gear shifting (occurrence of the uplock) based on the position of the sleeve or the stroke amount of the actuator taking account of the "deflection" of the hardware. In such a case, however, if there occurs no uplock or "deflection", it may not be determined that the gear shifting has completed even if the sleeve has moved to the position where it can be said that the gear shifting has completed, leading to determination of completion of the gear shifting at an inappropriate timing later than the actual completion timing of the gear shifting.

SUMMARY OF THE INVENTION

An object of the present invention is to provide a gear shifting completion determining device and a gear shifting completion determining method that can appropriately determine completion of gear shifting.

A gear shifting completion determining device according to an aspect of the present invention determines completion of gear shifting in a transmission in which gear shifting is carried out as a first part and a second part are meshed with each other by an actuator. The gear shifting completion determining device includes: a determining unit determining that gear shifting of the transmission has completed when a stroke amount of the actuator has reached a predetermined threshold value; a detecting unit detecting an operating state of a vehicle to which the transmission is mounted; and a setting unit setting the threshold value based on the operating state of the vehicle.

According to this invention, when the stroke amount of the actuator reaches the threshold value set based on the operating state of the vehicle, it is determined that gear shifting of the transmission has completed. A sleeve and a gear would not readily mesh with each other when the vehicle is stopped, for example. In this case, the hardware such as the gear train would likely suffer deflection due to the load applied to the transmission by the actuator. In contrast, the sleeve and the gear would readily mesh with each other while the vehicle is running, compared to the standstill state, so that the hardware such as the gear train and the actuator would hardly suffer deflection. Accordingly, the threshold value is set to a value in the direction where the sleeve and the gear would mesh with each other more firmly when the vehicle speed is lower than when the vehicle speed is higher. In this manner, it is possible to set an appropriate threshold value taking account of deflection when the hardware such as the gear train and the actuator would likely suffer deflection. This can suppress erroneous determination that the gear shifting has completed even if the gear shifting has not finished yet. On the other hand, in the case where deflection would hardly occur, it is possible to set an appropriate threshold value taking no account of deflection. This can suppress the undesired situation where it is determined that the gear shifting has completed at a timing later than the actual completion timing of the gear shifting. As a result, it is possible to provide a gear shifting completion determining device capable of appropriately determining completion of the gear shifting.

Preferably, the detecting unit detects a vehicle speed of the vehicle. The setting unit sets the threshold value to a value in a direction where the parts would mesh with each other more firmly when the vehicle speed is lower than when the vehicle speed is higher.

According to this invention, the threshold value is set to a value in the direction where the parts (for example, sleeve and gear) would mesh with each other more firmly when the vehicle speed is lower than when the vehicle speed is higher. As such, it is possible to set an appropriate threshold value taking account of deflection during the stopped state of the vehicle, for example, when the hardware such as the gear train would likely suffer deflection. As such, it is possible to suppress erroneous determination that the gear shifting has completed even if the gear shifting has not finished yet. Further, an appropriate threshold value taking no account of deflection can be set while the vehicle is running or the like when the hardware such as the gear train would hardly suffer deflection. Thus, it is possible to suppress determination of completion of gear shifting at a timing later than the actual completion timing of the gear shifting. As a result, completion of the gear shifting can be determined appropriately.

Still preferably, the setting unit is a first setting unit. The gear shifting completion determining device further includes: a load detecting unit detecting a load applied to the transmission by the actuator; and a second setting unit setting the threshold value to a value in a direction where the parts would mesh with each other more firmly when the load is greater than when the load is smaller.

According to this invention, in the case where the load applied to the transmission by the actuator is large, compared to the case where it is small, the threshold value is set to a value in the direction where the parts (for example, sleeve and gear) would mesh with each other more firmly. In this manner, it is possible to set a threshold value appropriately reflecting the deflection amount of the hardware such as the gear train. Accordingly, completion of the gear shifting can be determined appropriately.

A gear shifting completion determining method according to another aspect of the present invention is a method for determining completion of gear shifting in a transmission in which gear shifting is carried out as a first part and a second part are meshed with each other by an actuator. The gear shifting completion determining method includes the steps of: determining that gear shifting of the transmission has completed when a stroke amount of the actuator has reached a predetermined threshold value; detecting an operating state of a vehicle to which the transmission is mounted; and setting the threshold value based on the operating state of the vehicle.

According to this invention, when the stroke amount of the actuator has reached a threshold value that is set based on an operating state of the vehicle, it is determined that the gear shifting of the transmission has completed. A sleeve and a gear would not readily mesh with each other when the vehicle is stopped, for example. In this case, the hardware such as the gear train would likely suffer deflection due to the load applied to the transmission by the actuator. In contrast, the sleeve and the gear would readily mesh with each other while the vehicle is running, compared to the standstill state, so that the hardware such as the gear train and the actuator would hardly suffer deflection. Accordingly, the threshold value is set to a value in the direction where the sleeve and the gear would mesh with each other more firmly when the vehicle speed is lower than when the vehicle speed is higher. In this manner, it is possible to set an appropriate threshold value taking account of deflection when the hardware such as the gear train and the actuator would likely suffer deflection. This can suppress erroneous determination that the gear shifting has completed even if the gear shifting has not finished yet. On the other hand, in the case where deflection would hardly occur, it is possible to set an appropriate threshold value taking no account of deflection. This can suppress the undesired situation where it is determined that the gear shifting has completed at a timing later than the actual completion timing of the gear shifting. As a result, it is possible to provide a gear shifting completion determining method capable of appropriately determining completion of the gear shifting.

Preferably, the step of detecting an operating state of a vehicle includes the step of detecting a vehicle speed of the vehicle, and the step of setting the threshold value includes the step of setting the threshold value to a value in a direction where the parts would mesh with each other more firmly when the vehicle speed is lower than when the vehicle speed is higher.

According to this invention, the threshold value is set to a value in the direction where the parts (for example, sleeve and gear) would mesh with each other more firmly when the vehicle speed is lower than when the vehicle speed is higher. As such, it is possible to set an appropriate threshold value taking account of deflection during the stopped state of the vehicle, for example, when the hardware such as the gear train would likely suffer deflection. As such, it is possible to suppress erroneous determination that the gear shifting has completed even if the gear shifting has not finished yet. Further, an appropriate threshold value taking no account of deflection can be set while the vehicle is running or the like when the hardware such as the gear train would hardly suffer deflection. Thus, it is possible to suppress determination of completion of gear shifting at a timing later than the actual completion timing of the gear shifting. As a result, completion of the gear shifting can be determined appropriately.

Still preferably, the gear shifting completion determining method further includes the steps of: detecting a load applied to the transmission by the actuator; and setting the threshold value to a value in a direction where the parts would mesh with each other more firmly when the load is greater than when the load is smaller.

According to this invention, in the case where the load applied to the transmission by the actuator is large, compared to the case where it is small, the threshold value is set to a value in the direction where the parts (for example, sleeve and gear) would mesh with each other more firmly. In this manner, it is possible to set a threshold value appropriately reflecting the deflection amount of the hardware such as the gear train. Accordingly, completion of the gear shifting can be determined appropriately.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing a meshing start point between the spline of the sleeve and the clutch gear according to the embodiment of the present invention.

DESCRIPTION OF THE PREFERRED EMBODIMENTS

Figure 1:
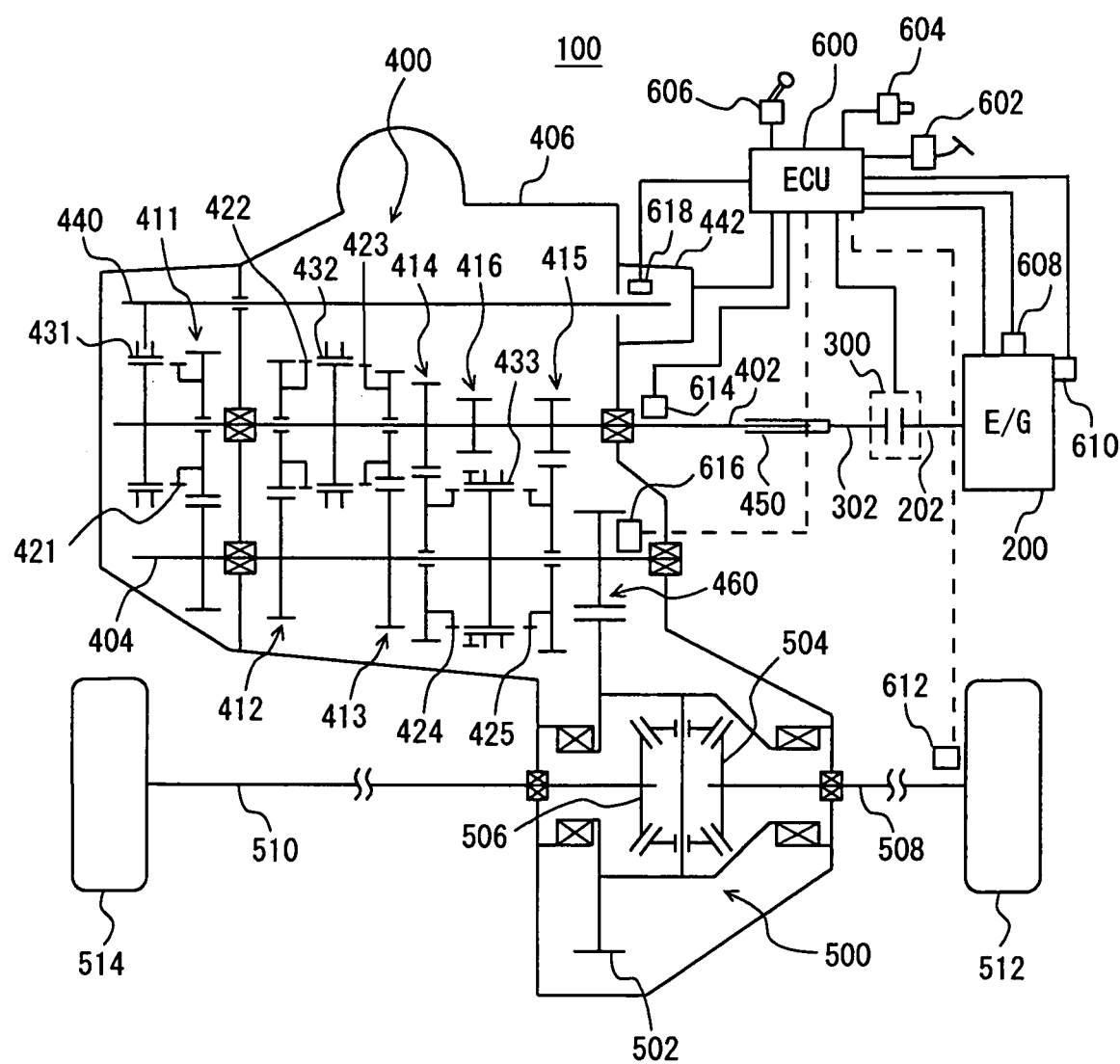
FIG. 1 is an overall view of a vehicle incorporating a gear shifting completion determining device according to an embodiment of the present invention.

Hereinafter, an embodiment of the present invention will be described with reference to the drawings. In the following, the same portions have the same reference characters allotted, and their designation and function are identical. Thus, detailed description thereof will not be repeated.

Referring to FIG. 1, a vehicle incorporating a gear shifting completion determining device according to an embodiment of the present invention will be described. The vehicle 100 is a FF (Front drive Front engine) vehicle. The vehicle to which the gear shifting completion determining device of the present invention will be mounted is not restricted to a FF vehicle.

Vehicle 100 is a clutch-pedalless vehicle in which a constant mesh-type gear transmission as of a conventional manual transmission and a clutch are activated by actuators to establish a desired gear. In vehicle 100, it is possible to select an auto shift mode, in which up-shift and down-shift are conducted based on a map defined by vehicle speed and throttle position, and a manual shift mode, in which a driver can select an arbitrary gear by his/her operation. In the auto shift mode, a sport mode can also be selected in which gear shifting is effected at an engine speed higher than usual.

Vehicle 100 includes an engine 200, a clutch 300, a transmission 400, a differential gear 500, and an ECU (Electronic Control Unit) 600. The gear shifting completion determining device of the present embodiment is implemented, e.g., by a program that is executed by ECU 600.

Engine 200 is an internal combustion engine wherein an air-fuel mixture of the fuel injected by an injector (not shown) and the air is exploded in a cylinder to press down a piston (not shown), to thereby rotate a crankshaft 202. Engine 200 is mounted to vehicle 100 as a motive power source. Vehicle 100 runs with the driving force from engine 200. It is noted that engine 200 may be replaced with another motive power mechanism such as a motor.

Figure 2:
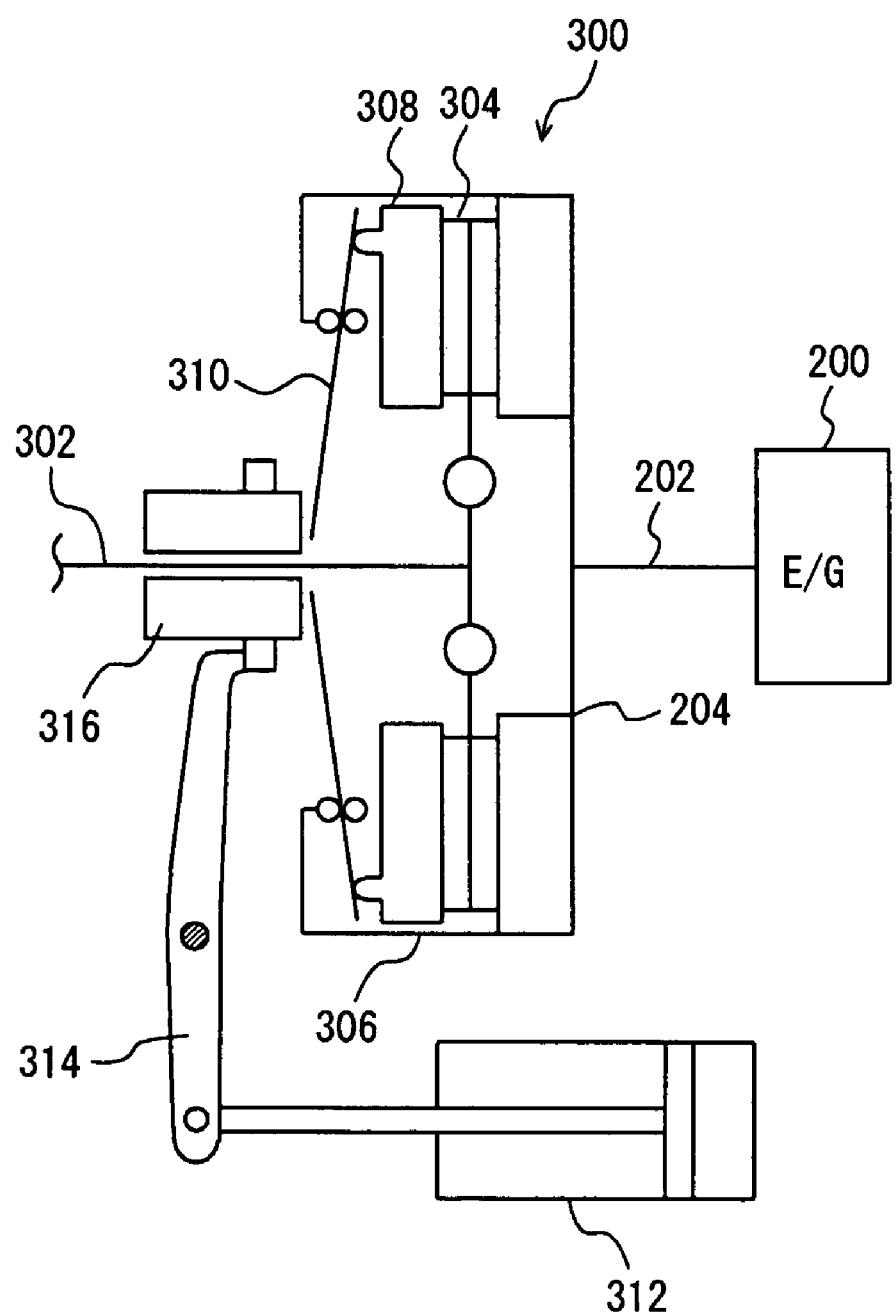
FIG. 2 is a cross-sectional view showing a clutch in the vehicle incorporating the gear shifting completion determining device according to the embodiment of the present invention.

Clutch 300 is a dry-type single plate friction clutch. As shown in FIG. 2, clutch 300 includes a clutch output shaft 302, a clutch disk 304 arranged at clutch output shaft 302, a clutch housing 306, a pressure plate 308 arranged at clutch housing 306, a diaphragm spring 310, a clutch release cylinder 312, a release fork 314, and a release sleeve 316.

When diaphragm spring 310 biases pressure plate 308 to the right direction in FIG. 2, clutch disk 304 is pressed against a flywheel 204 attached to crankshaft 202 of engine 200, whereby the clutch is connected.

When clutch release cylinder 312 moves release sleeve 316 to the right in FIG. 2 via release fork 314, the inner end portion of diaphragm spring 310 moves to the right in FIG. 2. When the inner end portion of diaphragm spring 310 moves to the right, pressure plate 308 moves to the left in FIG. 2. As a result, clutch disk 304 and flywheel 204 are separated from each other, whereby the clutch is disconnected.

Clutch release cylinder 312 is activated with a hydraulic pressure supplied by a hydraulic circuit (not shown). Clutch release cylinder 312 is controlled by ECU 600. A well-known, common technique can be used for clutch 300, and thus, further description will not be given here. It is noted that clutch 300 may be connected and disconnected by electric power.

Returning to FIG. 1, transmission 400 includes an input shaft 402, an output shaft 404, and a housing 406. Transmission 400 is arranged in housing 406 together with differential gear 500. Transmission 400 is a constant mesh-type gear transmission.

Input shaft 402 and output shaft 404 are arranged in parallel. A plurality of change gear pairs 411-415 having different gear ratios and a reverse gear pair 416 are arranged between input shaft 402 and output shaft 404.

Of the two gears constituting each change gear pair, one gear is provided at input shaft 402, while the other is provided at output shaft 404. Of the two gears constituting each change gear pair, one gear is capable of idling with respect to the corresponding shaft, while the other rotates together with the corresponding shaft. The two gears constituting each change gear pair constantly mesh with each other.

Clutch gears 421-425 are provided corresponding to change gear pairs 411-415, respectively. Synchromesh mechanisms 431-433 are arranged between the shafts and clutch gears 421-425 to couple them by synchronizing the number of revolutions of the shaft and the number of revolutions of the corresponding clutch gear 421-425. One of the first through fifth gears is established when one of clutch gears 421-425 is coupled to the shaft via one of synchromesh mechanisms 431-433. If no clutch gear is coupled to the shaft, transmission 400 is in a neutral state.

Reverse gear pair 416 meshes with an idler gear for rearward running that is arranged at a counter shaft (not shown). When reverse gear pair 416 meshes with the idler gear for rearward running, the reverse gear is established.

Synchromesh mechanisms 431-433 are activated via a fork shaft 440 by means of an actuator 442 that is controlled by ECU 600. Each of synchromesh mechanisms 431-433 is a key type synchromesh mechanism. It is noted that a double-cone synchromesh mechanism or the like may be used instead of the key type synchromesh mechanism.

Figure 3A:
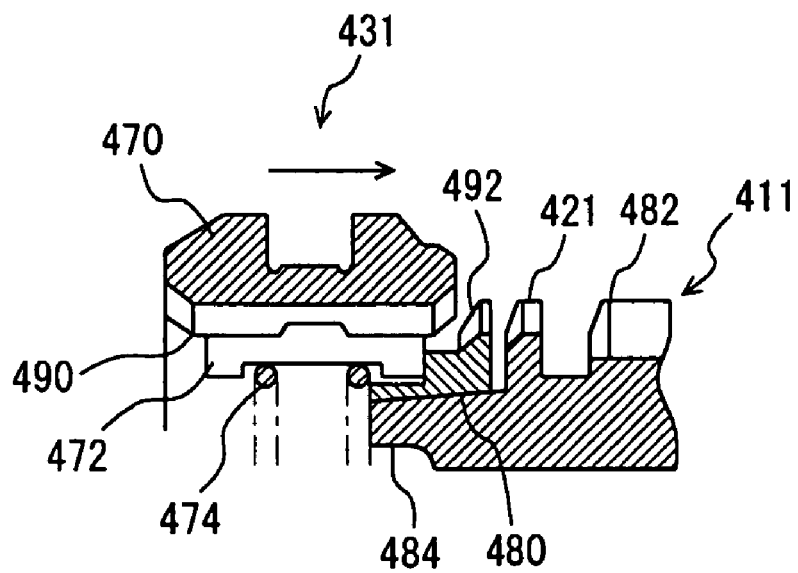
FIGS. 3A and 3B are partial cross-sectional views showing a synchromesh mechanism in the vehicle incorporating the gear shifting completion determining device according to the embodiment of the present invention.
Figure 3B:
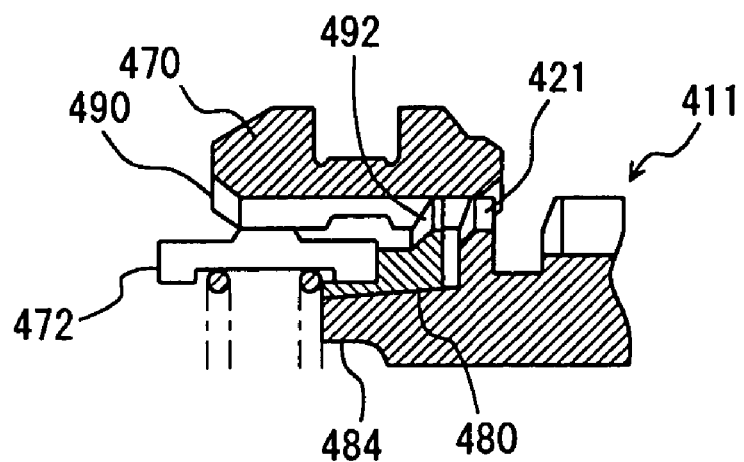

Referring to FIGS. 3A and 3B, synchromesh mechanism 431 will be described. It is noted that synchromesh mechanisms 432 and 433 are identical to synchromesh mechanism 431, so that description thereof will not be repeated.

As shown in FIG. 3A, synchromesh mechanism 431 includes a sleeve 470, a synchronizer key 472, a key spring 474, a synchronizer ring 480, and a tapered cone portion 484 provided at an input gear 482, which is one of the gears constituting change gear pair 411 provided in a manner capable of idling with respect to input shaft 402.

Sleeve 470 is moved toward clutch gear 421 by actuator 442 via fork shaft 440. Synchronizer key 472 is biased to sleeve 470 by key spring 474, and engages with sleeve 470. Sleeve 470 and synchronizer key 472, together with a synchronizer hub (not shown), rotate integrally with input shaft 402.

Synchronizer ring 480 is arranged between input gear 482 and synchronizer key 472. Synchronizer ring 480 is provided with a groove, which engages with synchronizer key 472, so that synchronizer ring 480 and synchronizer key 472 rotate together.

When sleeve 470 is moved to the right in FIG. 3A, synchronizer key 472 is moved together with sleeve 470. When synchronizer key 472 moves, synchronizer ring 480 is pressed against cone portion 484 and made to be taper-fitted.

When synchronizer ring 480 and cone portion 484 are taper-fitted, motive power is gradually transmitted from input shaft 402 to input gear 482 by friction between synchronizer ring 480 and cone portion 484. As synchronizer ring 480 and input gear 482 slip to some extent, the number of revolutions of input shaft 402 and the number of revolutions of input gear 482 gradually become equal (synchronized).

Input gear 482 constantly meshes with one of the gears constituting change gear pair 411 that is provided at output shaft 404 in an integrated manner. Thus, by synchronization of the number of revolutions of input shaft 402 with the number of revolutions of input gear 482, the number of revolutions of input shaft 402 becomes synchronized with the number of revolutions of output shaft 404.

When sleeve 470 is further moved to the right, as shown in FIG. 3B, a spline 490 provided at sleeve 470 comes to mesh with a spline 492 provided at synchronizer ring 480 and also with clutch gear 421 provided at input gear 482. When spline 490 of sleeve 470 meshes with clutch gear 421, input shaft 402 and output shaft 404 are coupled to each other, and motive power is transmitted from input shaft 402 to output shaft 404 via change gear pair 411.

For example, at the time of gear shifting during the running state of the vehicle, sleeve 470 and clutch gear 421 are both rotating, so that spline 490 of sleeve 470 smoothly meshes with clutch gear 421. In this case, the meshing start point is as shown by a dashed line in FIG. 4.

Meanwhile, at the time of gear shifting during the stopped state of the vehicle, for example, the gear itself including clutch gear 421 and synchronizer ring 480 would not rotate, so that it is necessary to rotate sleeve 470 and clutch gear 421 only by the thrust force of sleeve 470. However, there may be a case where the force required for thrusting away exceeds the force from actuator 442, which leads to occurrence of the uplock. Further, clutch gear 421 may be stopped at the position where it presses the head of sleeve 470, which may also cause the uplock.

When the uplock occurs, movement of sleeve 470 in the direction to mesh with clutch gear 421 is restricted. In such a case, even if sleeve 470 does not move, the stroke amount of actuator 442 in itself may increase due to deflection of the hardware.

Thus, in the event of occurrence of the uplock, the position of sleeve 470 in appearance, calculated back from the stroke amount of actuator 442, may coincide with the position of sleeve 470 in the case of absence of the uplock.

Returning to FIG. 1, input shaft 402 is coupled to a clutch output shaft 302 of clutch 300 via a spline 450, while output shaft 404 is provided with an output gear 460, which meshes with a ring gear 502 of differential gear 500.

Differential gear 500 includes a pair of side gears 504, 506. Drive shafts 508, 510 are coupled to side gears 504, 506, respectively, by spline fitting or the like. Motive power is transmitted to left and right front wheels 512, 514 via drive shafts 508, 510.

An accelerator position sensor 602, a sport mode switch 604, a shift lever 606, an engine speed sensor 608, a temperature sensor 610, a vehicle speed sensor 612, an input revolution number sensor 614, an output revolution number sensor 616, and a stroke sensor 618 are connected to ECU 600.

Accelerator position sensor 602 detects the press-down degree of the accelerator pedal, and transmits a signal representing the detected result to ECU 600. Sport mode switch 604 is operated by the driver when he/she prefers gear shifting at an engine speed higher than usual for a sporty drive placing priority on acceleration.

Shift lever 606 is operated by the driver so as to select a desired gear. The gear of transmission 400 is automatically established in response to a range (e.g., D range) corresponding to shift lever 606. The manual shift mode may also be selected, where the driver can select an arbitrary gear by his/her operation.

Engine speed sensor 608 detects the number of revolutions of engine 200, and transmits a signal representing the detected result to ECU 600. Temperature sensor 610 detects the oil temperature of engine 200, and transmits a signal representing the detected result to ECU 600. Vehicle speed sensor 612 detects the vehicle speed of vehicle 100 based on the number of revolutions of drive shaft 508, and transmits a signal representing the detected result to ECU 600. Input revolution number sensor 614 detects the number of revolutions of input shaft 402, and transmits a signal representing the detected result to ECU 600.

Output revolution number sensor 616 detects the number of revolutions of output shaft 404, and transmits a signal representing the detected result to ECU 600. Stroke sensor 618 detects the stroke amount of actuator 442 (the amount of movement of fork shaft 440 or sleeve 470), and transmits a signal representing the detected result to ECU 600.

ECU 600 controls various devices such that vehicle 100 attains a desired running state, based on the signals transmitted from the above-described sensors, a throttle position sensor (not shown) and the like and also based on maps and programs stored in a ROM (Read Only Memory).

Figure 5:
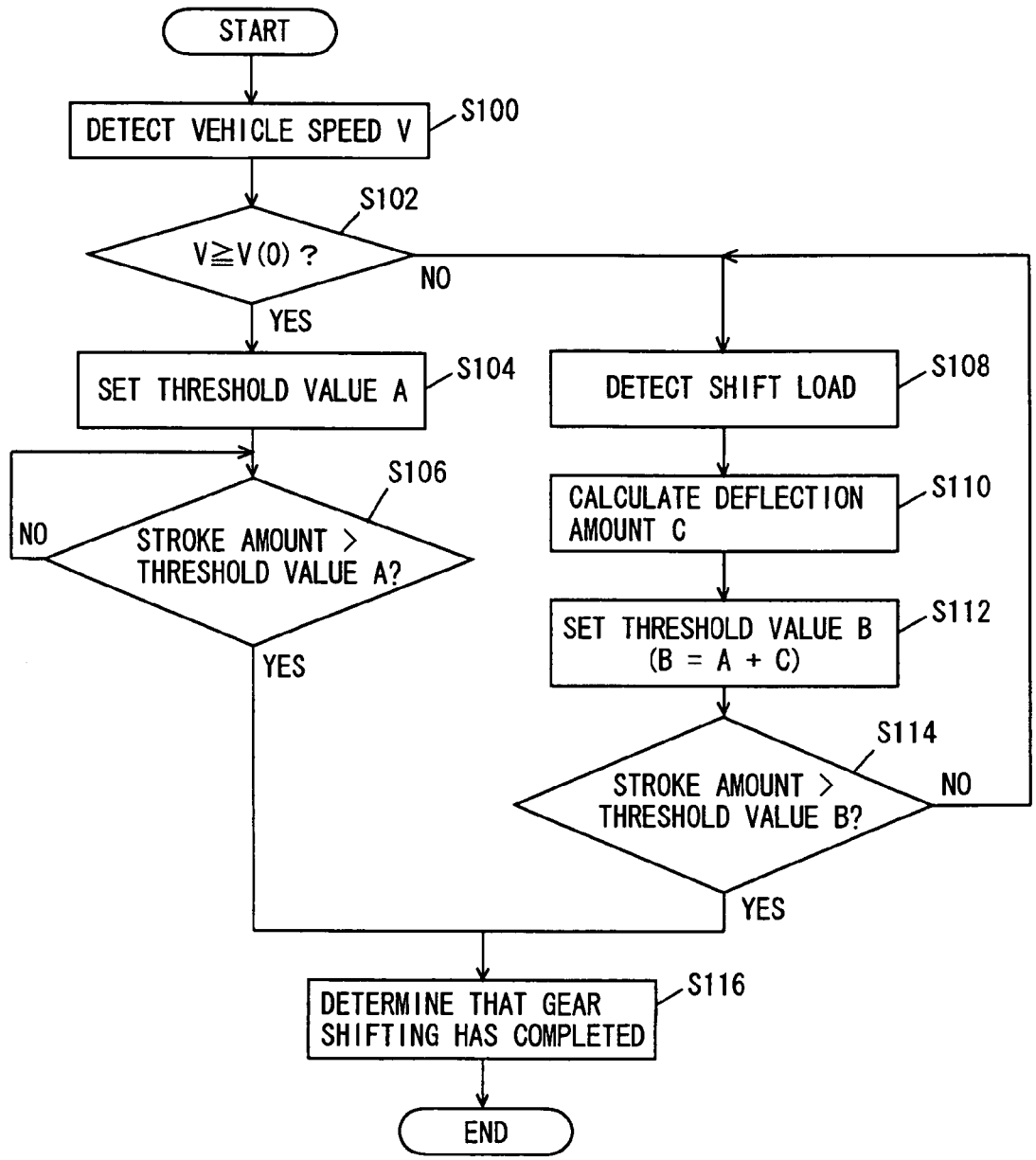
FIG. 5 is a flowchart illustrating a control structure of a program executed by an ECU that is the gear shifting completion determining device according to the embodiment of the present invention.

Referring to FIG. 5, a control structure of a program executed by ECU 600 that is the gear shifting completion determining device of the present embodiment will be described. It is noted that the program explained in the following is executed upon gear shifting of transmission 400.

In step (hereinafter, abbreviated as "S") 100, ECU 600 detects the vehicle speed V based on a signal transmitted from vehicle speed sensor 612. In S102, ECU 600 determines whether vehicle speed V is higher than a predetermined vehicle speed V(0). ECU 600 determines whether the vehicle is running or stopped by determining whether vehicle speed V is higher than the predetermined vehicle speed V(0). If vehicle speed V is higher than predetermined vehicle speed V(0) (YES in S102), the process proceeds to S104. If not (NO in S102), the process proceeds to S106.

In S104, ECU 600 sets a threshold value A to be compared with the stroke amount of actuator 442 for determining whether gear shifting has completed or not. For threshold value A, a value experimentally obtained in advance, with which it can be considered that sleeve 470 has moved to the meshing start point indicated by the dashed line in FIG. 4, is used.

In S106, ECU 600 determines whether the stroke amount of actuator 442 has reached threshold value A. If the stroke amount of actuator 442 has reached threshold value A (YES in S106), the process proceeds to S116. If not (NO in S106), the process returns to S106.

In S108, ECU 600 detects the shift load that is applied by actuator 442 to sleeve 470 of transmission 400 via fork shaft 440. The shift load is detected, e.g., using a map having the stroke amount of actuator 442 as a parameter. It is noted that the way of detecting the shift load is not restricted thereto; it may be detected using a map of stroke amount and hydraulic pressure if actuator 442 is of a hydraulic type. If actuator 442 is of an electrically driven type, the shift load may be detected using a map of voltage value or current value. Furthermore, the shift load may be detected in accordance with the gear established after gear shifting. Still further, the shift load may be detected based on the output of a strain gauge provided at fork shaft 440.

In S110, ECU 600 calculates a deflection amount C of the hardware. Deflection amount C is calculated based on a map having the shift load as a parameter. It is noted that instead of calculating deflection amount C from the shift load, it is possible to calculate deflection amount C directly from the stroke amount of actuator 442, hydraulic pressure, voltage value, current value, gear, the output of the strain gauge, and the like.

In S112, ECU 600 sets a threshold value B to be compared with the stroke amount of actuator 442 for determining whether gear shifting has completed or not, to a value corresponding to threshold value A for use when vehicle speed V is not lower than V(0) to which deflection amount C is added.

In S114, ECU 600 determines whether the stroke amount of actuator 442 has reached threshold value B. If the stroke amount of actuator 442 has reached threshold value B (YES in S114), the process proceeds to S116. If not (NO in S114), the process returns to S108. In S116, ECU 600 determines that the gear shifting has completed.

An operation of ECU 600 that is the gear shifting completion determining device according to the present embodiment based on the above-described structure and flowchart will now be described.

When gear shifting of transmission 400 is initiated, vehicle speed V is detected based on a signal transmitted from vehicle speed sensor 612 (S100). If vehicle speed V is higher than a predetermined vehicle speed V(0) (YES in S102), i.e., when it can be said that vehicle 100 is now running, a threshold value A to be compared with the stroke amount of actuator 442 for determining whether gear shifting has completed or not is set (S104).

For threshold value A, a value with which it can be considered that the sleeve and the clutch gear have started meshing in absence of deflection of the hardware is used. In this manner, it is possible to obtain the threshold value that does not take account of the deflection amount in the case where the hardware would not likely suffer deflection. If the stroke amount has reached this threshold value A (YES in S106), it is determined that the gear shifting has completed (S116). Accordingly, it is possible to suppress the situation where it is determined that the gear shifting has completed at a timing later than the actual meshing start timing.

Meanwhile, if vehicle speed V is lower than predetermined vehicle speed V(0) (NO in S102), i.e., when it can be said that vehicle 100 is stopped, the shift load is detected (S108), and deflection amount C of the hardware is calculated from the shift load (S110).

The threshold value B is set to be a value obtained by adding this deflection amount C to threshold value A used when vehicle speed V is not lower than V(0) (S12). That is, threshold value B is set to be a value greater than threshold value A.

In this manner, it is possible to obtain threshold value B taking account of the deflection amount in accordance with the shift load in the case where the hardware is likely to suffer deflection. If the stroke amount reaches threshold value B (YES in S114), it is determined that the gear shifting has completed (S116). As such, it is possible to suppress erroneous determination that the gear shifting has completed in spite of the fact that the spline of the sleeve and the clutch gear are not meshing with each other.

As described above, according to the ECU that is the gear shifting completion determining device of the present embodiment, in the case where vehicle speed V is higher than a predetermined vehicle speed V(0) and it can be said that the vehicle is running, the threshold value taking no account of the amount of deflection of the hardware is used to determine whether the gear shifting has completed or not. This can suppress the situation where it is determined that the gear shifting has completed at a timing later than the timing when meshing has actually started. Meanwhile, in the case where vehicle speed V is lower than the predetermined vehicle speed V(0) and it can be said that the vehicle is stopped, the threshold value taking account of the amount of deflection is used to determine whether the gear shifting has completed or not. This can suppress erroneous determination that the gear shifting has completed even if the spline of the sleeve and the clutch gear are not meshing with each other.

Although the stroke amount of actuator 442 is used for determining whether the gear shifting has completed or not in the present embodiment, instead of the stroke amount of actuator 442, the amount of movement of fork shaft 440 or sleeve 470 may be used to determine whether the gear shifting has completed or not.

Further, although the deflection amount is calculated based on the shift load in the present embodiment, instead of or in addition to the shift load, the number of times of gear shifting having been made, the running distance of the vehicle, or the time from manufacture may be used to calculate the deflection amount, taking into consideration that the deflection amount would increase because of deterioration with age of transmission 400.

Furthermore, it may be configured to set a smaller threshold value when vehicle speed V is lower than a predetermined vehicle speed V(0) than when it is greater than predetermined vehicle speed V(0), without calculating the deflection amount.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A gear shifting completion determining device in a transmission in which gear shifting is carried out as a first part and a second part are meshed with each other by an actuator, comprising:
   a determining unit determining that gear shifting of said transmission has completed when a stroke amount of said actuator has reached a predetermined threshold value;
   a detecting unit detecting an operating state of a vehicle to which said transmission is mounted; and
   a setting unit setting said threshold value based on said operating state of said vehicle.

2. The gear shifting completion determining device according to claim 1, wherein
   said detecting unit detects a vehicle speed of said vehicle, and
   said setting unit sets said threshold value to a value in a direction where said parts would mesh with each other more firmly when the vehicle speed is lower than when the vehicle speed is higher.

3. The gear shifting completion determining device according to claim 1, wherein said setting unit is a first setting unit,
   said gear shifting completion determining device further comprising:
   a load detecting unit detecting a load applied to said transmission by said actuator; and
   a second setting unit setting said threshold value to a value in a direction where said parts would mesh with each other more firmly when the load is greater than when the load is smaller.

4. A gear shifting completion determining device in a transmission in which gear shifting is carried out as a first part and a second part are meshed with each other by an actuator, comprising:
   determining means for determining that gear shifting of said transmission has completed when a stroke amount of said actuator has reached a predetermined threshold value;
   detecting means for detecting an operating state of a vehicle to which said transmission is mounted; and setting means for setting said threshold value based on said operating state of said vehicle.

5. The gear shifting completion determining device according to claim 4, wherein
- said detecting means includes means for detecting a vehicle speed of said vehicle, and
- said setting means includes means for setting said threshold value to a value in a direction where said parts would mesh with each other more firmly when the vehicle speed is lower than when the vehicle speed is higher.

6. The gear shifting completion determining device according to claim 4, further comprising:
- means for detecting a load applied to said transmission by said actuator; and
- means for setting said threshold value to a value in a direction where said parts would mesh with each other more firmly when the load is greater than when the load is smaller.

7. A gear shifting completion determining method in a transmission in which gear shifting is carried out as a first part and a second part are meshed with each other by an actuator, comprising the steps of:
- determining that gear shifting of said transmission has completed when a stroke amount of said actuator has reached a predetermined threshold value;
- detecting an operating state of a vehicle to which said transmission is mounted; and
- setting said threshold value based on said operating state of said vehicle.

8. The gear shifting completion determining method according to claim 7, wherein
- said step of detecting an operating state of a vehicle includes the step of detecting a vehicle speed of said vehicle, and
- said step of setting said threshold value includes the step of setting said threshold value to a value in a direction where said parts would mesh with each other more firmly when the vehicle speed is lower than when the vehicle speed is higher.

9. The gear shifting completion determining method according to claim 7, further comprising the steps of:
- detecting a load applied to said transmission by said actuator; and
- setting said threshold value to a value in a direction where said parts would mesh with each other more firmly when the load is greater than when the load is smaller.

* * * * *